July 28, 1964 G. L. MARTIN 3,142,822
APPARATUS FOR SAMPLING, STORING AND SUMMING SIGNALS
Filed June 29, 1961 2 Sheets-Sheet 1
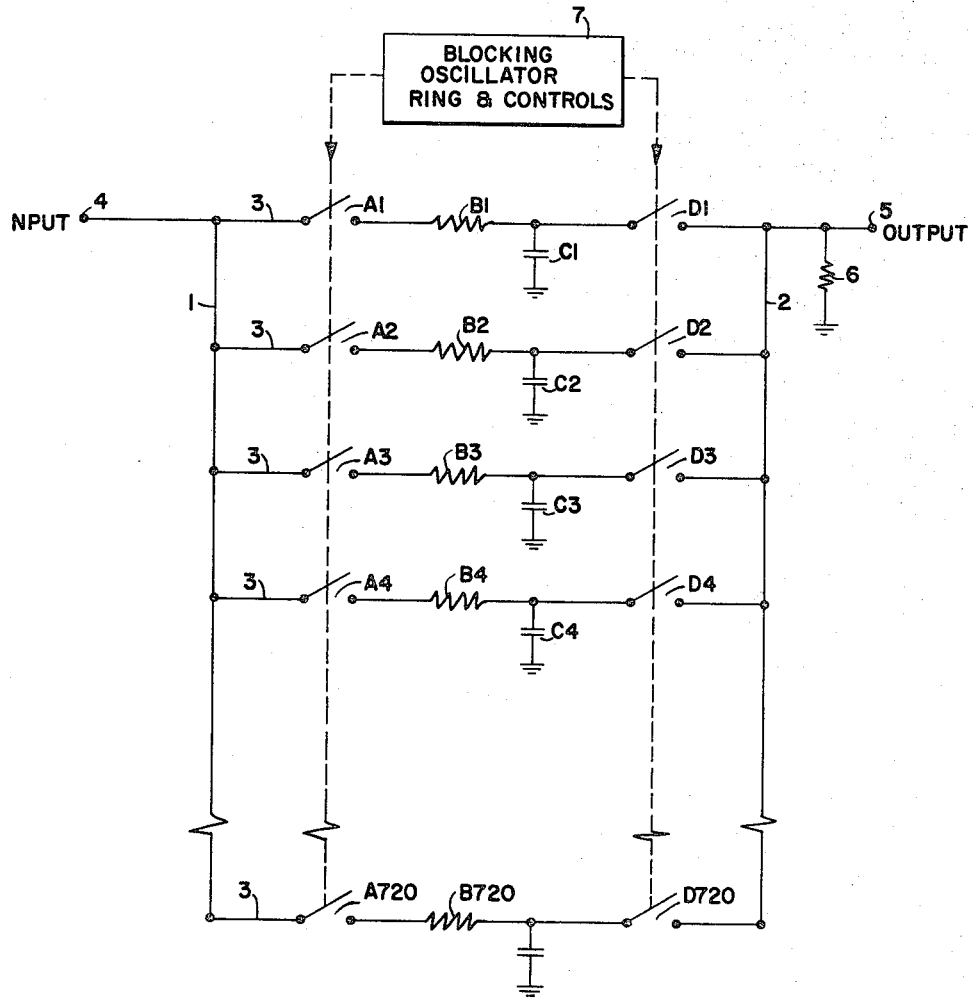
FIG.—1
INVENTOR.
GREGORY L. MARTIN
BY
ATTORNEY

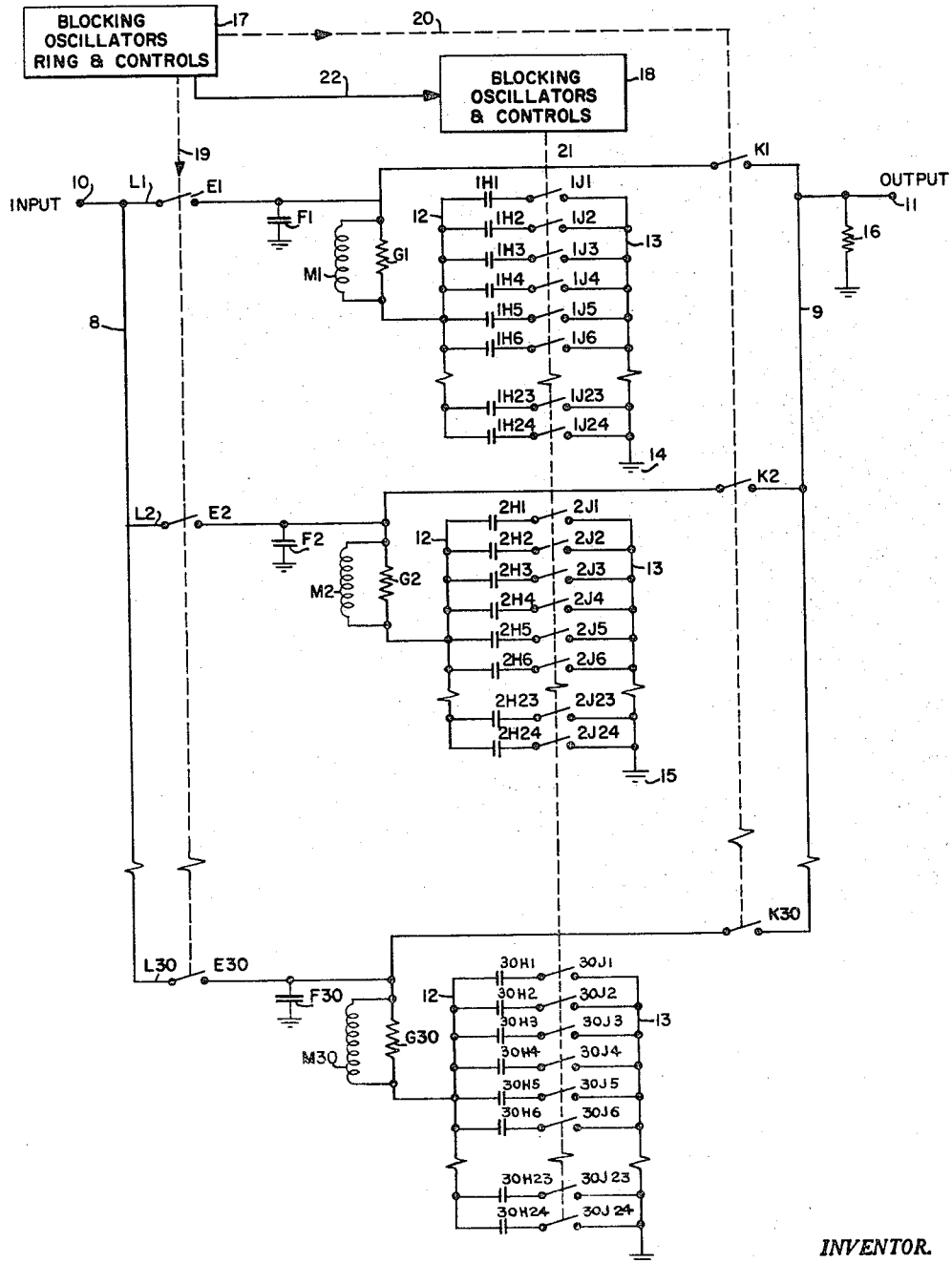
FIG.—2

United States Patent Office 3,142,822
Patented July 28, 1964

3,142,822
APPARATUS FOR SAMPLING, STORING AND SUMMING SIGNALS
Gregory L. Martin, Phoenix, Ariz., assignor to Goodyear Aerospace Corporation, a corporation of Delaware
Filed June 29, 1961, Ser. No. 120,761
7 Claims. (Cl. 340—173)

This invention relates to switching apparatus for use in sampling and summing sweep signals and is particularly applicable in sampling and summing radar sweeps separated by equal intervals of time and covering identical lengths of time. It has been found especially useful in the construction of radar data processors.

It is an object of the invention to provide for sampling and summing incoming sweep signals rapidly and efficiently with a number of switches.

Another object is to provide simplified switching and storing circuitry for range-gating a given number of sequential pulse trains at a multitude of ranges.

Another object is to reduce the bulk and weight of apparatus for this purpose.

These and other objects will appear from the following description, reference being had to the accompanying drawings forming a part hereof.

Of the drawings:

FIG. 1 is a schematic diagram showing a system utilizing the circuitry of the invention for switching and storing samples of incoming signal; and FIG. 2 is a schematic diagram of another embodiment of the switching and storing system of the invention.

In order to understand the problem involved, consider a series of radar sweeps separated by equal time intervals and covering identical lengths of time. For purposes of illustration, assume that it is desired to examine the returns from a single azimuth bearing, and, along that particular bearing, to further segregate the returns from a predetermined number of distance intervals. In various radars (particularly the Doppler types) and other applications it is often desirable to sample the signal from each of these sweeps at a given range increment and then to sum these signals for the number of sweeps being considered. Such procedure results in an accumulation of individual signals, each of a magnitude individually such that the strength of the return is insufficient for display purposes, but when sequentially "piled up," the summation signal is of sufficient level to show well in display. Since the sweeps do not occur simultaneously, this requires that the signal at a given range increment on each sweep must be stored until the signals for that same range increment from subsequent sweeps have arrived. After the predetermined desired number of sweeps have been received, then all the stored signals may be added together. In practice, it has been found necessary to do this for a great number of separate range increments.

One system of accomplishing the foregoing method is to store the sweep signals in parallel lines on a storage tube and then to read out the storage tube at right angles to the stored sweeps. Thus each readout sweep results in a set of signals from all of the sweeps at the same range on each sweep. Summing each readout sweep signal then supplies the desired information. This system has been found objectionable because of the bulk and weight of the storage tube and also because of the poor resolution of the storage tubes which seriously limits the number of range elements obtainable.

If an effort to overcome at least some of the difficulties encountered in employing the foregoing, the system utilized and described herein has been developed. A system utilizing the method of the invention is schematically ilustrated in FIG. 1. Referring to this figure, two conductors 1 and 2 are bridged by a number of shunt circuits 3, which shunt circuits are identical. The uppermost shunt circuit 3 includes storage means comprising a resistance B1 in series with and between two switches A1 and D1 adapted to open and close the shunt line from the input conductor 1 and the output conductor 2. A storage capacitor C1 connects a point between resistor B1 and switch D1 to ground. An input terminal 4 is connected to the conductor 1, and an output terminal 5 is connected to the conductor 2.

For purposes of illustration, assume that the signal return is over a time period of 144 micro-seconds (representing a return pulse of approximately 12 miles), and that such range is divided into seven hundred and twenty range increments, each representing an interval of 0.2 microsecond. As a result, the arrangement shown utilizes seven-hundred and twenty shunt circuits 3, and is such that signals applied to input terminal 4 may be sequentially stored in capacitors C1, C2, C3, C4 and so forth through C720, provided the respective input switches A1, A2, A3, A4 through A720 are sequentially closed, and the respective output switches D1, D2, D3, D4, through D720 are open. Furthermore, with an input switch open and the respective output switch closed, the stored signals may be delivered at the output terminal 5 due to the discharge of the storage capacitor associated with that particular shunt line. A resistor 6 connected to ground on one side and to the output terminal 5 on the other side may be utilized to properly balance the output impedance.

For the input switches A1 through A720, and the output switches D1 through D720, a four-diode switch was utilized; typical four-diode switches being shown in "Waveforms," by Chance et al., vol. 19, Radiation Laboratory Series, 1949, McGraw-Hill Book Co., Inc., page 374, FIGURE 10–10. Electronic switches are believed more expedient in this application inasmuch as it is necessary to use a rapid switching sequence time-wise.

To achieve rapid swicthing, means well-known in the art to actuate electronic switches of the nature described were used; namely a timer 7 utilizing blocking oscillators and associated circuitry. Typical timing circuitry and blocking oscillators therefor are shown in "Waveforms," by Chance et al., vol. 19, Radiation Laboratory Series, 1949, McGraw-Hill Book Co., Inc., pages 602–604, FIG. 17.1, and pages 621–624, FIG. 17–21. The blocking oscillators are arranged in the well-known "ring" circuit, whereby, asuming we have seven hundred and twenty blocking oscillators, the triggering of the first blocking oscillator (B.O.) automatically presents the second B.O., etc., through the entire ring sequence; the last B.O. in turn pre-setting the first B.O. again. In all switch actuation hereinafter described, it should be kept in mind that the sequential pattern of the operation of the switches originates with such B.O. circuitry.

When the first range increment of the first radar sweep arrives at input 4 (which is connected to conventional radar equipment well-known in the art), switch A1 closes momentarily, storing the signal for that increment on capacitor C1. Immediately thereafter, due to the sequential pattern set by the timer 7, switch A1 opens and switch A2 closes, storing the signal for the next adjacent range increment on capacitor C2. Since seven hundred and twenty range increments are required to be stored, the circuit includes seven hundred and twenty shunt circuits 3 for storage of the increments, and the above process must be repeated seven hundred and twenty times (once for each shunt line 3) until the last range increment is stored in capacitor C720. Thus, for one sweep, seven hundred and twenty switches must close and open in rapid succession.

In a typical application it may be required to sum the signals for each range increment from a total of a predetermined number of sweeps. Assuming sixty sweep summation is desired, this means that after the sixtieth sweep each input switch A1 through A720 has closed and opened sixty times and sixty signals have been stored on each of the capacitors C1 through C720 corresponding to each of the seven-hundred and twenty range increments.

For read-out of such stored information, switches D1 through D720 sequentially close momentarily and feed to the output terminal 5 the total signal due to summing the signals from the above sixty individual sweeps at the first range increment of interest. When switch D1 opens, switch D2 closes, producing at the output 5 the summed signal for the second range of interest. This is repeated until the seven-hundred and twenty summed signals have been fed sequentially to the output 5, whence the signals are utilized in whatever manner desired, such as visual display by means well-known to one skilled in the art.

To recapitulate, for a sixty sweep cycle summation, seven hundred and twenty gate input switches closing and opening sixty times each, and seven hundred and twenty gate output switches closing and opening one time each may be the cycle utilized with the method of the invention.

However, by proper choice of the R-C time constant and the impedance of the circuit connected to the output terminal 5, the condition can be had where the charge accumulated at any instant (providing for an initial warm-up period for the apparatus) will be the summation of only a predetermined number of stored signals. For example, utilizing an R-C time constant of about twenty micro-seconds, and feeding from the output terminal 5 into a high impedance, our sequence could be as follows. Switch A1 closes supplying C1 with the sixtieth signal increment. Then A1 opens and A2 and D1 simultaneously close. Into C2 now goes the sixtieth signal of the second range increment, and meanwhile at the output 5 appears a signal representative of the summation of the sixty signals stored in C1. Then simultaneously, A2 and D1 open, and A3 and D2 close to supply C3 with its sixtieth range increment, and the output 5 with the summation of the second range increment. This sequence continues until A720 and D719 open and simultaneously D720 and A1 close. At the output 5 will then appear the summation of sixty signals representing the seven hundred and twentieth range increment. However, more pertinent to the cycle description, the closing of input switch A1 will cause condenser C1 to assume a charge which is significantly influenced by only the last sixty signal inputs because of the R-C relationship. It will thus be seen that utilizing the cycle just described, input switches A1 through A720, and output switches D1 through D720 operate continuously with a constant flow of signal being presented to output terminal 5 representative only of the last group of sixty signals. The result of electrically so designing the circuitry involved is that all the output switches D1 through D720 are continuously in operation in the same manner and speed as the cycling for the input switches A1 through A720, thus more efficiently utilizing the circuit, and furthermore, that the flow of intelligence from the output terminal 5 is continuous rather than cyclic.

In another embodiment of the invention in switch circuitry, the number of switches required for the operation hereinabove described may be reduced. Referring now to FIG. 2 of the drawings, which is a schematic drawing of apparatus constructed in accordance with and embodying the invention, an input line 8 and an output line 9 are provided connected continuously with an in-phase video input terminal 10 and an in-phase video output terminal 11 respectively. Lines 8 and 9 are spanned by thirty identical parallel shunt circuits (L1 through L30) of which only three (L1, L2, and L30) are completely shown.

Referring to the first shunt circuit L1, this includes a normally open input fast gate switch E1 at its input end and a normally open readout fast gate switch K1 at its output end. Between these input and readout gates an input capacitor F1 has one terminal connected to the output side of the input switch E1, and the other terminal to ground. A resistor G1 connects the line side of the condenser F1 to an input storage line 12, which in turn is connected to twenty-four normally open parallel storage circuits of identical construction, of which only the first six and last two are shown in the interests of clarity. A typical storage circuit such as the first one shown in the first shunt circuit L1, includes a storage capacitor 1H1 and a normally open slow gate transfer switch 1J1, both in series through an output storage line 13 to a ground 14. An inductance M1 is provided connected in parallel across the resistor G1 for purposes described hereinafter.

In like manner the second shunt circuit L2 includes a normally open input fast gate switch E2 at its input end, and a normally open readout fast gate switch K2 at its output end. An input capacitor F2 is provided to connect the output side of the input switch E1 to ground, and a resistor G2 connects the line side of the capacitor F2 to the input storage line 12, which in turn is connected to a second group of twenty-four normally open parallel storage circuits of identical construction. Each such storage circuit includes a storage capacitor such as 2H1, and in series therewith, a slow gate transfer switch such as 2J1 in the first storage circuit thereof; the series being connected on the capacitor side to input storage line 12 and on the switch side to output storage line 13; the latter in turn being connected to a ground 15.

For purposes of clarity, only the first two and the last shunt circuits are shown in detail. It will be apparent that the component nomenclature has been chosen so as to be orderly; for example, F21 would represent the first storage capacitor in the twenty-first shunt circuit equivalent in function to F1 or F2 shown in FIGURE 2.

A resistor 16 may be utilized to connect the output terminal 11 to ground to provide desired output impedance balance.

For purposes of description of the operation of the circuitry of the embodiment shown in FIG. 2, let us assume that again seven hundred and twenty separate range increments from sixty successive separate sweeps are to be summed. In the interests of clarity of description, the operation and function of the components and circuitry of shunt circuit L1 will be first described. Assuming the first range increment of interest appears at the input terminal 10, input switch E1 is closed and the signal is stored as a charge on the input capacitor F1. The switch E1 is opened and the transfer switch 1J1 is closed to thus transfer the charge from the input capacitor F1 to the storage capacitor 1H1. Since the storage capacitor 1H1 is selected to have a much greater capacity than the input capacitor F1, nearly all the charge representing signal intelligence is removed from the input capacitor F1 and appears on the storage capacitor 1H1. The inductance M1 is provided in shunt across the resistor G1 and functions in the manner well known in the art; namely, to improve the charging characteristic (or as will be seen later as the description proceeds, the discharging characteristics) of the storage capacitor 1H1. Assuming now that the transfer switch 1J1 has opened, if the readout switch K1 is closed, a signal representative of the stored voltage on the storage capacitor 1H1 appears at the output terminal 11. The high impedance design of the output, and the display circuitry to which it connects, is such that there will be but small change in the charge remaining on the storage capacitor 1H1. Consequently if another input signal is brought into the input capacitor F1 and then transferred to the storage capacitor 1H1 in the manner previously described, the charge resulting on 1H1 will be representative of a summation of these two signals; namely, the newly arrived input signal and the signals remaining and stored in 1H1.

Continuing this analysis of shunt circuit L1, and assuming that summation of sixty signal inputs is desired at the output 11, the characteristics and values of F1, G1, and 1H1 are so predetermined as to result in each readout representing the sum of the last sixty signal inputs. In other words, let us assume a sufficient "warm-up" period has elapsed and that we transfer into the storage capacitor 1H1 signal #2060. After the transfer, the voltage on the storage capacitor 1H1 will represent the summation of signals starting from #2000 through #2060, and this value will be read out by the closing of the transfer switch 1J1 and the readout switch K1. Signal #2061 will then be transferred to the storage capacitor 1H1 and when switches 1J1 and K1 again close, the signal appearing at the output terminal 11 will represent the summation of signals #2001 through #2061, or the last sixty signals received. Such circuit action is accomplished by proper balance of circuit components. As an example resulting in the above sixty-signal summation cycle, the input capacitor F1 had a value of 0.0015 mfd., the resistor G1 had a value of 330 ohms, the inductance M1 had a value of 220 microhenries, and the storage capacitor had a value of 0.1 mfd.

With the above description in mind as to the operation of a single shunt circuit, let us proceed with a description of the operation of the system overall. Assuming again for purposes of illustration a sixty-signal summation cycle with seven hundred and twenty range increments of interest to be examined, and also assuming a "warm-up" period has passed during which the equipment has been operating, the first range increment signal appears at the input terminal 10. Input switch E1 is closed and the signal is stored on the input capacitor F1. Input switch E1 is then opened and the second range increment signal is transferred to the input capacitor F2 in shunt line L2 by the closing of input switch E2. Each subsequent range increment signal is similarly sequentially fed through the closing of the series of switches E3 through E10 in shunt lines L3 through L10 to input capacitors F3 through F10, respectively. The eleventh range increment signal passes to input capacitor F11 in shunt line L11 by the closing of the input switch E11; however, simultaneously therewith, transfer switches 1J1, 2J1, 3J1, etc., through 10J1 are closed to simultaneously transfer the signal charges on input capacitors F1, F2, F3, etc., through F10 to storage capacitors 1H1, 2H1, 3H1, etc., through 10H1, respectively. Meanwhile, input switch E11 opens.

Starting with the twelfth range increment signal, input switch E12 is closed to transfer this signal to the input capacitor F12. The same procedure is sequentially followed for inputs up through the twentieth range increment signal.

When the twenty-first range increment signal appears at the input terminal 10, input switch E21 closes to charge the input capacitor F21. However, simultaneous with the closing of the input switch E21, transfer switches 11J1, 12J1, 13J1, etc., through 20J1 close to transfer the stored signals on F11, F12, F13, etc., through F20 to the storage capacitors 11H1, 12H1, 13H1, etc., through 20H1, respectively. Meanwhile, input switch E21 opens.

The twenty-second range increment signal from the output terminal 10 is then connected to the input capacitor F22 by the closing of the input switch E22 in shunt line L22. Similarly the twenty-third through thirtieth range increment signals are stored in input capacitors F23 through F30 by the closing of the respective input switches E23 through E30 in shunt lines L23 through L30, respectively.

All during the above described sequence, each of the switch series 1J1 through 10J1, and 11J1 through 20J1 have remained closed; this extended time interval permitting the charges on the respective input capacitors F1 through F10, and F11 through F20 to equalize and transfer to charges on the respective storage capacitors 1H1 through 10H1 and 11H1 through 20H1. On the closing of the input switch E28, the respective transfer switches 1J1 through 10J1 are simultaneously opened.

On arrival of the thirty-first range increment signal, the input switch E1 in shunt line L1 is closed and the input capacitor F1 is again charged. Again the thirty-second through the fortieth range increment signals are stored in the respective input capacitors F2 through F10 by the sequential closing and opening of input switches E2 through E10 in shunt lines L2 through L10, respectively. However, with the closing of input switch E8, the transfer switches 11J1 through 20J1, which have been closed, are simultaneously opened.

On the arrival of the forty-first range increment signal at the input terminal 10, input switch E11 is closed to charge the input capacitor F11 in shunt line L11. However, again simultaneously with the closing of the input switch E11, transfer switches 1J2, 2J2, 3J2, etc., through 10J2 are closed to transfer the signal from the first ten input capacitors F1 through F10 to the second line of storage capacitors 1H2, 2H2, 3H2, etc., through 10H2. Meanwhile, the input switch E11 opens.

Again, with the forty-second range increment signal at the input terminal 10, another sequence following the pattern above is initiated. It is felt that the above detailed step-by-step procedure is sufficient for an understanding of how the remaining range increment signals through the seven hundred and twentieth are processed. In a complete cycle of seven hundred and twenty range increments, each of the input switches such as E1 will close and open twenty-four times. Each sequential opening and closing routes the incoming signal eventually to one of the seven hundred and twenty storage circuits such as are represented by the presence of a storage capacitor (H-series) and a transfer switch (J-series). The transfer switches (J-series) are held closed as described until just before the storage capacitors must be made available for an incoming sequence. Such delayed closing permits the charge to equalize and transfer under optimum conditions.

With the presence of the first range increment signal of a new cycle, the above entire sequence is repeated and, for example, the first range increment signal will be eventually stored in the storage capacitor 1H1.

Keeping the above in mind, the "read out" cycle can now be described. To read out a particular storage circuit, two switches must be closed: the appropriate shunt line readout switch (K-series) and the corresponding transfer switch (J-series). For example, to readout the signal previously stored on the storage capacitor 1H1, the readout switch K1 is closed after the transfer switch 1J1 has been operated but just before E1 closes again. This sequence of supplying signal readout to the output terminal 11 is continually in progress during the storage and transfer actions described hereabove. For example, readout switch K1 is closed simultaneously with input switch E29, switch K2 closes simultaneously with E30, switch K3 closes simultaneously with E1, etc. Of course, actuation of E30 in this sequence would open K1 and 1J1, and of E1 would open K2 and 2J1, etc., sequentially.

The above readout sequence continues through the J1 series, J2 series, through the J24 series until all seven hundred and twenty storage capacitors (H-series) are read out, at which time the process is repeated.

It will thus be apparent that the readout switches (K-series) operate individually with an appropriately selected input switch (E-series).

In accordance with the previously described selection of component values, while a constant sequential flow of range increment signals is being appropriately switched from the input terminal 10, a constant sequential flow of summed signals representative of a predetermined number of stored individual signals is presented at the output terminal 11 in an orderly array for utilization in display circuitry well-known to one skilled in the art and the details of which will not need further elaboration in view of the state of this art.

It will be understood that the switching sequence described is such as to entail extremely rapid action, therefore electronic switches are preferred for the E-series, K-series, and J-series switches. However it will be apparent that the J-series only operates once for each twenty-four switching actions of its respective E-series or K-series switch, and therefore can be a slow gate switch. Typical switches for these three series are four-diode switches such as have been described hereabove in connection with FIGURE 1. Since the J-series switches are grounded on one side, two-diode switches may well be utilized resulting in a savings in cost, and such switches can be found on page 372, FIGURE 10-8, of the textbook "Waveforms" previously identified in connection with the description of FIGURE 1 hereinbefore.

Switch coordination and control is had by the provision of combinations of blocking oscillators such as are shown in FIGURE 2 by numerals 17 and 18. The blocking oscillator (B.O.) ring and controls incorporated in equipment block 17 determines and actuates the sequential operation described hereinabove of the E-series and K-series of switches through suitable control connections 19 and 20. The equipment block 18 determines and actuates the sequential operation described hereinabove of the J-series of switches through a suitable control connection 21, and is in turn suitably connected to equipment box 17 through connection 22 to provide the proper inter-coordinating sequence of the J-series of switches with the E-series and K-series of switches.

Blocking oscillators, both individually and in combinations such as the B.O. ring of equipment block 17 are well-known in circuitry and use to one skilled in the art, and therefore need not be further described in detail herein.

It will be realized at this point that the embodiment of the invention as shown and described herein in connection with FIGURE 2, offers certain advantages over the embodiment shown and described herein in connection with FIGURE 1. These advantages are as follows:

(a) A lesser number of switches is required. For the example given of seven hundred and twenty range increments of interest to be examined, stored, and displayed, six hundred and sixty less switches are required in the arrangement shown in FIGURE 2 over that of FIGURE 1.

(b) Of the switches required for the apparatus shown in FIGURE 2, only sixty fast-acting switches are required (the other seven hundred and twenty sufficing to be slow-acting), whereas the apparatus of FIGURE 1 requires that all fourteen hundred and forty switches all be of the fast-acting type.

(c) The apparatus of FIGURE 2 permits multiple use of a single pulse; i.e., a single pulse can be used to trigger a number of switches. Consequently less equipment such as B.O.'s is required.

It will be further apparent to one skilled in the art that the invention is not limited to the particular number of range increments or summation storage limit utilized above to illustrate operation. Utilization of more or less L-series shunt circuits, and/or storage line branches, and/or other predetermined summation storage limits than those particularly described hereinabove, may be had by evident expedients applied to the circuits shown and described herein. For each particular application, certain performance characteristics will be desired and appropriate design criteria based thereon will determine the circuitry detail, preset limits, and the like hereinbefore described.

While certain representatve embodiments and details have been shown for the purpose of illustrating the invention, it will be apparent to those skilled in this art that various changes and modifications may be made therein without departing from the spirit or scope of the invention.

What is claimed is:

1. Apparatus for switching and storing a series of sets of $n$ incoming sequential signals comprising input means for said signals, output means, control means, and $n$ electrical storage means actuated by the control means and coupled between the input and output means, each of said storage means sequentially and separately storing one of said incoming $n$ signals while at substantially the same sequential rate as said sequential storing separately presenting only a substantially small portion of each stored signal to the output means, the remainder of such stored signal being summed electrically with a corresponding signal in the next incoming set of $n$ signals.

2. In a switching and storing system, the combination of an input terminal connected to a series of incoming sequential signals; an output terminal; a plurality of parallel circuit means coupling the input and output terminals each including an input storage means coupled to the input terminal, an output storage means in series with the input storage means and coupled to the output terminal, and switching means for transferring an incoming signal between said recited circuit elements to sequentially store the signal in the input storage means, transfer therefrom substantially all of said stored signal to the output storage means, and then transfer therefrom at the same sequential rate only a small portion of the re-stored signal to the output terminal, the remainder being added electrically to a following incoming signal.

3. Apparatus for switching and storing of an input of a consecutive series of sets of $n$ incoming sequential signals comprising an input terminal; an output terminal; mutually parallel $n$ storage circuit means therebetween each including in series connection reciting from the input terminal an input electronic switch means, a resistance means, an electrical storage means, and an electronic output switch means; and control means coupled to and activating said input and output switch means to sequentially store each incoming signal in a respective storage circuit and to sequentially supply such stored signal to the output terminal with said sequential input and output rates being the same; said storage and resistance means electrically proportioned to permit only a substantially small proportion of the signal stored to appear at the output terminal, the remainder being electrically added to the next incoming signal.

4. Electronic switching apparatus for switching and storing a series of sets of $n$ incoming sequential signals, said apparatus comprising an input for receiving said incoming signals; an output; a plurality of parallel primary shunt circuits each spanning the input and output, said shunt circuits being less in number than the number $n$ of incoming signals to be sampled and summed but being evenly divisible into $n$, each primary shunt circuit including a normally open input switch and a normally open readout switch, each shunt circuit being connected between said switches to a grounded primary storage capacitor; each primary shunt circuit also being connected through an impedance to a plurality of parallel secondary shunts, each secondary shunt comprising a secondary storage capacitor and a normally open transfer switch in series to ground; and control means coupled to said switches to provide sequential switch operation to separately store each incoming signal temporarily in a primary capacitor, then in a secondary capacitor, and then separately present a portion of said stored signal to the output at the same sequence as said incoming signals, the remainder thereof being retained in the secondary capacitor and summed electrically with a corresponding incoming signal of the following set of $n$ incoming signals.

5. Electronic switching apparatus for switching and storing a series of sets of $n$ incoming sequential signals, said apparatus comprising an input for receiving said incoming signals; an output; a plurality of parallel primary shunt circuits each spanning the input and output, said shunt circuits being less in number than the number $n$ of incoming signals to be sampled and summed but being evenly divisible into $n$, each primary shunt circuit including a normally open input switch and a normally open readout switch, each shunt circuit being connected between said switches to a grounded primary storage capacitor having sufficient capacity to store one of said incoming signals; each primary shunt circuit also being connected through an impedance to a plurality of parallel secondary shunts, each secondary shunt comprising a secondary storage capacitor having sufficient capacity to store a summed number of incoming signals transferred thereto and a normally open transfer switch in series to ground; and control means coupled to said switches to provide sequential programming therefor to separately store each incoming signal temporarily in a primary capacitor, then in a secondary capacitor, and then separately present a portion of said stored signal to the output at the same sequential rate as said incoming signals, the remainder thereof being retained in the secondary capacitor and summed electrically with a corresponding incoming signal of the following set of $n$ incoming signals.

6. Electronic switching apparatus for switching and storing a series of sets of $n$ incoming sequential signals, said apparatus comprising an input for receiving said incoming signals; an output; a plurality of parallel primary shunt circuits coupled between the input and output, said shunt circuits being less in number than the number $n$ of incoming signals to be sampled and summed but being evenly divisible into $n$, each primary shunt circuit including a normally open input switch and a normally open readout switch, said input switches being momentarily closable in succession each upon arrival of a preassigned incoming signal by timing pulses, each primary shunt circuit being connected between said switches to a grounded primary storage capacitor having sufficient capacity to store one of said incoming signals; each primary shunt circuit also being connected through an impedance to a plurality of secondary shunts, each secondary shunt comprising a secondary storage capacitor having capacity to store a summed number of incoming signals transferred thereto from the primary storage capacitor and a normally open transfer switch in series to ground; the number of secondary shunt circuits connected to each primary shunt circuit being equal to the number $n$ of incoming signals in one set divided by the number of primary shunt circuits; and programming means coupled to said switches and causing actuation thereof by timed pulses to sequentially operate the switches in a predetermined order to initially store an incoming signal in a primary capacitor by actuation of an appropriate input switch, then transfer substantially said signal to a preselected secondary capacitor by actuation of an appropriate transfer switch, and then present at the same sequential rate as said incoming signals a portion at least of the signals stored in the secondary capacitor to the output means by actuation of both the appropriate transfer and readout switches, the remainder of said re-stored signal being retained in the secondary capacitor and summed electrically with a corresponding incoming signal of the following set of $n$ incoming signals.

7. Apparatus for switching and storing of a series of sets of $n$ incoming sequential signals comprising an input terminal receiving said $n$ signals; $n$ storage circuits each including electrical storage means and switch means in series, said storage circuits grouped into sets of $p$ storage circuits each; means electrically coupling the storage circuits within each set in parallel; $p$ input circuits coupled at one circuit and to the input terminal and each including input storage means and switch means in series, resistance means coupling each one of the input circuits at the other circuit and to one of the storage circuit sets; $p$ output circuits each including switch means and each coupled at one circuit end to a respective storage circuit set; an output terminal coupled to the other circuit end of each of the output circuits; and switch control means coupled to the storage, input, and output circuit switch means for sequentially storing one of said $n$ signals on one of the input storage means while concurrently therewith sequentially transferring at substantially the same sequential rate as said sequential storing such similarly stored signals from another input storage means to one of its corresponding output storage means, with each of the input storage means being utilized $n/p$ times sequentially for storage, and concurrently sequentially transferring such similar output stored signals from another output storage means to the output terminal, the utilization of any particular individual circuit being actuated during such instant as it may not be active in another function; the comparative electrical balance between the input storage means, the resistance means, and the output storage means being such that substantially one of said $n$ signals taken from each of an $r$ number of sets is available at any particular instant during operation in summed form in a preselected output storage means and only substantially one $n$ signal is available in the input storage means at any particular instant during operation.

References Cited in the file of this patent
UNITED STATES PATENTS

| | | |
|---|---|---|
| 2,410,233 | Percival | Oct. 29, 1946 |
| 2,430,038 | Wertz | Nov. 4, 1947 |
| 2,557,086 | Fisk et al. | June 19, 1951 |
| 2,956,274 | Smythe | Oct. 11, 1960 |